United States Patent
Benz et al.

(10) Patent No.: US 7,152,394 B2
(45) Date of Patent: Dec. 26, 2006

(54) SYSTEM AND METHOD FOR REDUCING NITROGEN OXIDES IN THE EXHAUST OF AN INTERNAL COMBUSTION ENGINE

(75) Inventors: Uwe Benz, Oberuhldingen (DE); Berthold Keppeler, Owen (DE); André Martin, Idstein (DE); Peter Schuerstedt, Wernau (DE); Detlef zur Megede, Kirchheim (DE)

(73) Assignee: NuCellSys GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 10/484,459

(22) PCT Filed: Jul. 19, 2002

(86) PCT No.: PCT/EP02/08097
§ 371 (c)(1),
(2), (4) Date: Dec. 23, 2004

(87) PCT Pub. No.: WO03/009925
PCT Pub. Date: Feb. 6, 2003

(65) Prior Publication Data
US 2005/0126158 A1 Jun. 16, 2005

(30) Foreign Application Priority Data
Jul. 21, 2001 (DE) ................. 101 35 646

(51) Int. Cl.
*F01N 3/00* (2006.01)
(52) U.S. Cl. .................. 60/286; 60/274; 60/298; 60/301; 60/303
(58) Field of Classification Search ............ 60/274, 60/276, 286, 298, 301, 303, 320; 422/168, 422/173
See application file for complete search history.

(56) References Cited

U.S. PATENT DOCUMENTS

| | | | | |
|---|---|---|---|---|
| 4,033,133 A | | 7/1977 | Houseman et al. | 60/606 |
| 5,201,802 A | * | 4/1993 | Hirota et al. | 60/285 |
| 5,272,871 A | * | 12/1993 | Oshima et al. | 60/274 |
| 5,477,676 A | | 12/1995 | Benson et al. | 60/274 |
| 5,524,432 A | * | 6/1996 | Hansel | 60/274 |
| 5,753,188 A | * | 5/1998 | Shimoda et al. | 422/108 |
| 5,802,846 A | * | 9/1998 | Bailey | 60/278 |
| 5,813,222 A | * | 9/1998 | Appleby | 60/274 |
| 5,899,063 A | | 5/1999 | Leistritz | 60/298 |
| 5,921,076 A | | 7/1999 | Krutzsch et al. | 60/274 |
| 5,934,073 A | * | 8/1999 | Gieshoff et al. | 60/320 |
| 5,987,885 A | * | 11/1999 | Kizer et al. | 60/286 |
| 6,021,640 A | * | 2/2000 | Hirota et al. | 60/300 |
| 6,122,909 A | * | 9/2000 | Murphy et al. | 60/286 |
| 6,471,924 B1 | * | 10/2002 | Feeley et al. | 423/213.5 |

(Continued)

FOREIGN PATENT DOCUMENTS

DE 39 20 159 A1 1/1991

(Continued)

*Primary Examiner*—Thomas Denion
*Assistant Examiner*—Diem Tran
(74) *Attorney, Agent, or Firm*—Crowell & Moring LLP

(57) ABSTRACT

In a system and method for the reduction of nitrogen oxides in the exhaust of an internal combustion engine, the exhaust line of the internal combustion engine contains a DeNOx catalytic converter, in which the nitrogen oxides are reduced by means of hydrogen that is produced on-board the vehicle. The DeNOx catalytic converter is incorporated into a temperature-controlled heat exchanger, allowing the DeNOx catalytic converter to be operated within a desired temperature range, thereby improving the level of conversion.

11 Claims, 1 Drawing Sheet

Figure 1:
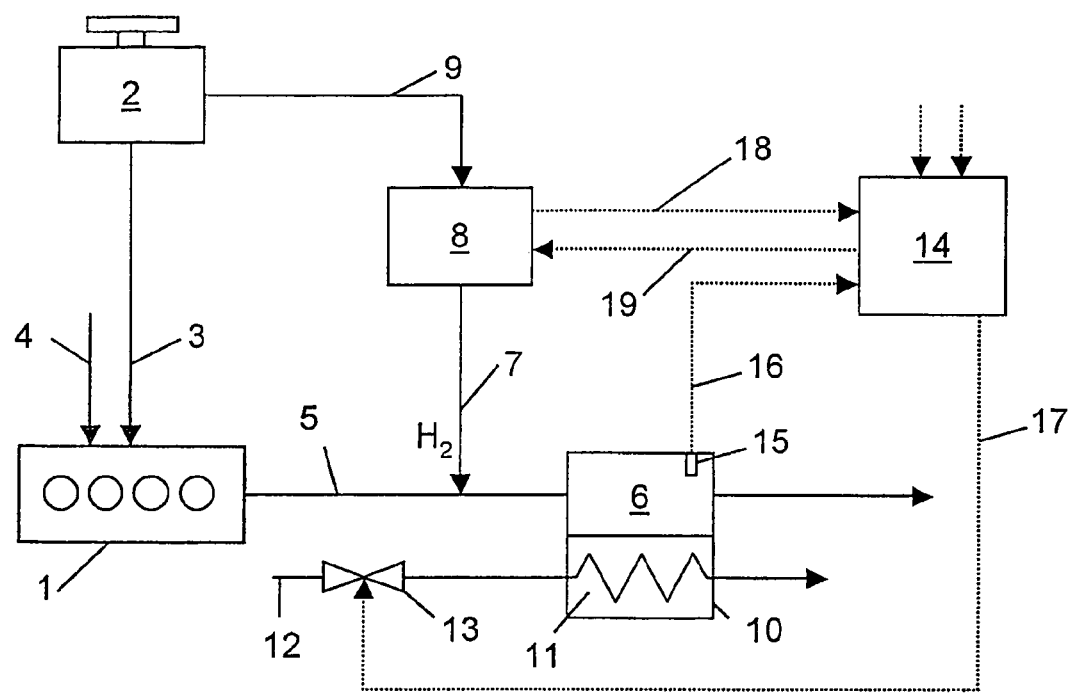

U.S. PATENT DOCUMENTS 6,748,736 B1 * 6/2004 Claverie et al. .............. 60/298
6,854,263 B1 * 2/2005 Bruck et al. ................... 60/285

FOREIGN PATENT DOCUMENTS

| | | |
|---|---|---|
| DE | 42 15 942 A1 | 12/1992 |
| DE | 298 17 756 U1 | 5/1999 |
| EP | 0 537 968 B1 | 1/1996 |
| EP | 0 881 366 B1 | 1/1996 |
| EP | 0 947 683 A2 | 10/1999 |
| EP | 1 094 206 A2 | 4/2001 |
| JP | 60-32919 | 2/1985 |
| JP | 2001-164932 | 6/2001 |

* cited by examiner

SYSTEM AND METHOD FOR REDUCING NITROGEN OXIDES IN THE EXHAUST OF AN INTERNAL COMBUSTION ENGINE

FIELD OF THE INVENTION

The invention concerns a system and a method to reduce nitrogen oxides in the exhaust of an internal combustion engine.

DESCRIPTION OF THE RELATED ART

Due to excess air that is almost always present in diesel engine exhaust, it is not possible to completely eliminate all gaseous pollutants—such as carbon monoxide, hydrocarbons, and nitrogen oxides (NOx)—using the 3-way catalytic converters that have been state of the art technology for gasoline engines for years. Even though diesel engine exhaust contains some reducing substances, such as carbon monoxide and hydrocarbons, their concentration is not significant compared to the amount of nitrogen oxides to be reduced. Gasoline engines that run on a lean mixture are faced with the same problem. An additional problem is the comparatively low exhaust temperature.

Future exhaust emission standards require conversion levels of nitrogen oxides in the exhaust of higher than 80%, which has been very difficult to achieve.

One option for eliminating nitrogen oxides from exhaust is the selective catalytic reduction ("SCR") process, in which nitrogen oxides in the exhaust stream are catalytically and selectively reduced to nitrogen through the use of an added reducing agent, such as fuel, carbon monoxide, ammonia, urea, or hydrogen.

The conversion level of nitrogen oxides is not sufficient in a reduction process using only added fuel. In addition, this sometimes gives rise to strongly elevated hydrocarbon emissions. Providing an additional reducing agent, such as ammonia or urea, requires an additional tank and additional safety measures. Similar problems are encountered when hydrogen is carried in pressure tanks or tanks for liquids. For this reason, an attractive reducing agent, particularly for cold-start up, is presently seen to be hydrogen produced on-board thermally or catalytically from the same fuel used in the internal combustion engine.

EP 0 537 968 B1 describes a device to reduce nitrogen oxides in the exhaust of internal combustion engines. A DeNOx (nitrogen oxide removal) catalytic converter is included in the exhaust line. Hydrogen is produced by a hydrogen generator on-board the vehicle from the internal combustion engine fuel, and is introduced into the exhaust line upstream of the DeNOx catalytic converter. Using the fuel intended for the internal combustion engine eliminates the need for an additional tank, which would require additional space and result in additional weight.

However, there remains a need for improved systems and methods for reducing nitrogen oxides in the exhaust of internal combustion engines with an improved level of conversion.

BRIEF SUMMARY OF THE INVENTION

Using a heat exchanger design with active cooling of the DeNOx catalytic converter makes it possible to set a temperature level that is suitable for the reduction reaction in all operating states. This improves the selectivity of the reaction, which results in a higher level of conversion in the reduction of nitrogen oxides. At the same time, less hydrogen is needed, and thus less additional fuel, which lowers fuel consumption. Moreover, thermal control over the reaction in the DeNOx catalytic converter can be maintained even when large quantities of hydrogen are added.

The use of a temperature sensor enables very simple and accurate control of the temperature in the DeNOx catalytic converter. A multi-stage design of the DeNOx catalytic converter offers advantages with respect to the level of conversion of nitrogen oxides.

These and other aspects will be evident upon reference to the attached figure and following detailed description.

BRIEF DESCRIPTION OF DRAWING(S)

FIG. 1 is a block diagram of an embodiment of the present system and method for the reduction of nitrogen oxides in the exhaust of internal combustion engines, in particular diesel and gasoline engines.

DETAILED DESCRIPTION OF THE INVENTION

Referring to FIG. 1, an internal combustion engine 1 is supplied with fuel from a fuel tank 2 through a first fuel line 3 and with air through an intake line 4. In internal combustion engine 1, fuel is combusted together with the air, and the resulting exhaust is discharged through an exhaust line 5.

Exhaust line 5 contains a DeNOx catalytic converter 6, in which nitrogen oxides contained in the exhaust are converted by a reducing agent at a suitable catalyst. Hydrogen or a hydrogen-rich gas is used as the reducing agent, and is introduced into exhaust line 5 upstream of DeNOx catalytic converter 6 through a hydrogen feed line 7. In addition to DeNOx catalytic converter 6, exhaust line 5 may contain other components (not shown), such as, for example, additional oxidation catalysts or an exhaust sound absorber.

The hydrogen or hydrogen-rich gas is produced on-board the vehicle in a hydrogen-generating reactor 8 from the fuel used in internal combustion engine 1. Fuel is supplied from fuel tank 2 to hydrogen-generating reactor 8 through a second fuel line 9. In hydrogen-generating reactor 8 (e.g. a reformer) the fuel is converted to a hydrogen-rich gas by means of well-known processes, possibly with the addition of further reactants such as water or an oxygen-containing medium. Preferably the hydrogen-rich gas produced is a synthesis gas, i.e. a mixture that consists predominantly of hydrogen and carbon monoxide. A gas purification and gas separation unit (not shown) may be provided between hydrogen-generating reactor 8 and DeNOx catalytic converter 6, so that a gas with higher hydrogen content or almost pure hydrogen can be supplied into exhaust line 5 through hydrogen feed line 7.

The reaction that takes place in hydrogen-generating reactor 8 preferably is a catalytic partial oxidation. However, in principle it is also possible to carry out—instead of or in addition to the partial oxidation—thermal pyrolysis (with the disadvantage of particulate soot formation) and/or steam reforming (with the disadvantage of requiring extra water). One or several subsequent shift stages can also be included, in order to increase the hydrogen concentration while simultaneously reducing the carbon monoxide content.

In DeNOx catalytic converter 6, nitrogen oxides in the exhaust are selectively reduced at the catalyst with the added hydrogen to produce nitrogen and water, so that no, or only small amounts of, nitrogen oxides are discharged into the environment. Such DeNOx catalytic converters have been available for some time.

In a representative embodiment, DeNOx catalytic converter 6 is arranged on one side of a heat exchanger 10. Coolant is directed through the cooling side 11 of heat exchanger 10. This coolant is supplied to, and discharged from, cooling side 11 of heat exchanger 10 by way of a coolant line 12, which contains a valve 13. Preferably, valve 13 is located in coolant line 12 upstream of heat exchanger 10.

Preferably, the coolant is a gas, such as the intake air of the internal combustion engine, or air supplied by a fan. Other options include cooling by means of exhaust recirculation or cooling using the liquid coolant of the internal combustion engine. On cooling side 11 of heat exchanger 10, the coolant may be carried in countercurrent, co-current and/or cross-current flow with respect to the exhaust in DeNOx catalytic converter 6.

Valve 13 is used to control the coolant flow through cooling side 11 of heat exchanger 10, and thus the temperature in the catalytic reaction zone of DeNOx catalytic converter 6.

For this purpose, the illustrated embodiment includes a temperature sensor 15 in DeNOx catalytic converter 6. However, the temperature sensor may be located in exhaust line 5 downstream of DeNOx catalytic converter 6. Temperature sensor 15 provides a controller 14 with the measured temperature through an instrument lead 16. On the basis of the measured temperature, controller 14 determines a suitable setting for valve 13 and relays it to valve 13 through a control line 17. This makes it possible to maintain the temperature in DeNOx catalytic converter 6 within a specified or desired temperature range during all operating states.

In another embodiment, a fan can be used to supply the cooling air and the fan speed can be varied in response to the temperature sensor 15 reading to adjust the desired coolant flow, eliminating the need for valve 13. Other devices that can be used as valve 13 include ventilating valves or conventional valves. Under the right circumstances, valve 13 may be eliminated entirely, such as in an optimized design of DeNOx catalytic converter 6 or if the hydrogen supply is optimized or controlled as a function of the load.

The required quantities of hydrogen can be produced in hydrogen-generating reactor 8 from the existing fuel. In contrast to the arrangement where fuel is supplied directly into the exhaust line, the separate production and introduction of hydrogen does not lead to additional hydrocarbon emissions, and only slightly increases fuel consumption. The composition of the hydrogen-containing gas (e.g. content of hydrogen, carbon monoxide, and/or methane) produced by hydrogen-generating reactor 8 can be matched to a certain degree to the requirements of DeNOx catalytic converter 6 by varying the operating parameters, thereby changing the thermodynamic equilibrium position. For this purpose, as shown in the representative embodiment in FIG. 1, suitable measuring and control lines 18, 19 may be provided between hydrogen-generating reactor 8 and controller 14. Controller 14 may be equipped with additional monitoring inputs.

Hydrogen possesses a very high selectivity for NOx reduction at temperatures below 200° C., whereas it is almost completely combusted with the excess air at higher temperatures. The reaction of nitrogen oxide and hydrogen is an exothermic reaction, and part of the hydrogen and the carbon monoxide is usually oxidized by the oxygen that is present, which also releases heat. Consequently, if no active cooling is present, DeNOx catalytic converter 6 and the exhaust are heated by these reactions, reducing the selectivity for the reduction of nitrogen oxides.

In order to control the temperature of the DeNOx catalytic converter, DeNOx catalytic converter 6 is integrated with a cooling system 11 in a heat exchanger 10. This arrangement leads to active cooling of the DeNOx catalytic converter 6, which makes it possible—using a suitable adjustment of the coolant flow—to maintain DeNOx catalytic converter 6 within a specified or desired temperature range. Aside from the shown heat exchanger design, it is of course possible to use other known cooling elements to cool DeNOx catalytic converter 6. However, the temperature control for the DeNOx catalytic converter 6 of the present system and method makes it possible to always achieve a high selectivity for the reduction of nitrogen oxides. This allows the use of catalysts that possess sufficient selectivity in only a narrow temperature range.

The DeNOx catalyst material may be present in the form of catalytically active elements (e.g. pellets, fleece) or as a coating on reactor walls or installed component parts (e.g. turbulence generators, spacer elements). It is possible to vary the catalyst loading along the length of the reactor to adjust the thermal transfer properties and the catalytic characteristics. This makes it possible to set a temperature profile suitable for the reaction.

Instead of the single-stage design of DeNOx catalytic converter 6 shown in the representative embodiment, the DeNOx catalytic converter may be of a multi-stage design. In such an embodiment, the reducing agent is introduced into the exhaust at several locations, always into an adiabatic stage, which is followed by intermediate cooling in a heat exchanger.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A system to reduce nitrogen oxide emissions of an internal combustion engine having an exhaust line, the system comprising:
    a DeNOx catalytic converter in the exhaust line, the DeNOx catalytic converter having a reactor portion comprising a catalyst for performing a catalytic reduction reaction of nitrogen oxides, and a temperature regulating portion;
    a hydrogen-generating reactor; and
    a hydrogen feed line connecting the hydrogen-generating reactor to the exhaust line upstream of the DeNOx catalytic converter; wherein,
    the temperature regulating portion of the DeNOx catalytic converter comprises at least one channel; and
    the at least one channel is connected to receive at least one of intake air supplied to the internal combustion engine and a partial exhaust stream that is recirculated to the internal combustion engine.

2. The system of claim 1, further comprising a fuel tank, the fuel tank being connected to supply fuel to the hydrogen-generating reactor and the internal combustion engine.

3. The system of claim 1 wherein the DeNOx catalytic converter comprises at least two stages, each stage in the exhaust line with at least one hydrogen feed line connecting the hydrogen generating reactor to the exhaust line upstream of each stage.

4. The system of claim 1, further comprising a temperature sensor associated with the DeNOx catalytic converter, and a mechanism for adjusting the supply of coolant fluid to the channels in response to the temperature sensor.

5. The system of claim 4 wherein the mechanism for adjusting the supply of coolant fluid to the channels comprises a valve disposed in the coolant line and a controller associated with the valve and the temperature sensor for adjusting the supply of coolant fluid.

6. The system of claim 4 wherein the mechanism for adjusting the supply of coolant fluid to the channels comprises a controller for adjusting the speed of a device directing coolant fluid through the channels.

7. The system of claim 4 wherein the temperature sensor is disposed in the DeNOx catalytic converter.

8. The system of claim 4 wherein the temperature sensor is in the exhaust line downstream of the DeNOx catalytic converter.

9. A method of reducing nitrogen oxide emissions from an internal combustion engine, the method comprising:
   (a) passing exhaust from the internal combustion engine through a DeNOx catalytic converter having a catalyst for performing a catalytic reduction reaction of nitrogen oxides; and
   (b) maintaining the temperature of the DeNOx catalytic converter within a desired temperature range by supplying a coolant fluid to a heat exchanger integrated with the DeNOx catalytic converter; wherein,
   said coolant fluid comprises at least one of intake air supplied to the internal combustion engine and a partial exhaust stream that is recirculated to the internal combustion engine.

10. The method of claim 9 wherein the amount of coolant fluid supplied to the heat exchanger is adjusted based on a parameter indicative of the temperature of the DeNOx catalytic converter.

11. The method of claim 10, further comprising monitoring the temperature in the DeNOx catalytic converter.

* * * * *